(12) United States Patent
Roberts

(10) Patent No.: US 7,093,606 B2
(45) Date of Patent: Aug. 22, 2006

(54) LIQUID FERTILIZER INJECTOR SYSTEM FOR LAWN SPRINKLER SYSTEMS AND IRRIGATION SYSTEMS

(76) Inventor: Kenneth J. Roberts, 2320 Lemturner Rd., Callahan, FL (US) 32011

( * ) Notice: Subject to any disclaimer, the term of this patent is extended or adjusted under 35 U.S.C. 154(b) by 397 days.

(21) Appl. No.: 10/614,369

(22) Filed: Jul. 8, 2003

(65) Prior Publication Data

US 2005/0005974 A1   Jan. 13, 2005

(51) Int. Cl.
*G05D 11/03* (2006.01)
(52) U.S. Cl. ............. 137/14; 137/205.5; 137/268; 137/564.5; 222/386.5; 222/389
(58) Field of Classification Search ............ 137/564.5, 137/205.5, 268, 14; 222/386.5, 389
See application file for complete search history.

(56) References Cited

U.S. PATENT DOCUMENTS

| | | | | |
|---|---|---|---|---|
| 2,509,570 A * | 5/1950 | Lee | ............................ | 222/23 |
| 2,735,589 A * | 2/1956 | Milster et al. | ............ | 222/386.5 |
| 2,865,388 A * | 12/1958 | Sternbergh | ............... | 137/564.5 |
| 3,770,198 A * | 11/1973 | Mihara | .......................... | 239/10 |
| 4,109,831 A * | 8/1978 | Culpepper et al. | .......... | 222/254 |
| 4,171,710 A * | 10/1979 | Boynton et al. | ............ | 137/238 |
| 4,210,175 A * | 7/1980 | Daniels et al. | ............ | 137/564.5 |
| 4,324,294 A * | 4/1982 | McLoughlin et al. | ......... | 169/13 |
| 4,527,353 A | 7/1985 | Newby | ............................ | 47/59 |
| 4,651,765 A * | 3/1987 | Beth | .............................. | 137/99 |
| 4,768,712 A * | 9/1988 | Terrell | .......................... | 239/68 |
| 4,867,192 A | 9/1989 | Terrell et al. | .................. | 137/93 |
| 4,870,991 A | 10/1989 | McMillan et al. | ...... | 137/624.12 |
| 4,886,212 A * | 12/1989 | Proctor et al. | ............... | 239/315 |
| 4,895,303 A | 1/1990 | Freyvogel | ..................... | 239/61 |
| 5,009,244 A * | 4/1991 | Grindley et al. | ........ | 137/101.11 |
| 5,094,269 A * | 3/1992 | Agulia | ...................... | 137/564.5 |
| 5,227,068 A | 7/1993 | Runyon | ....................... | 210/610 |
| 5,337,930 A * | 8/1994 | Fah et al. | ..................... | 222/630 |
| 5,499,750 A * | 3/1996 | Manifold | .................. | 222/386.5 |
| 5,730,364 A | 3/1998 | Gertie | .......................... | 239/201 |
| 6,148,839 A | 11/2000 | Gonske | ........................... | 137/3 |
| 6,173,732 B1 | 1/2001 | Davis et al. | .................. | 137/377 |
| 6,267,303 B1 | 7/2001 | Francis | ........................ | 239/318 |
| 2002/0000476 A1 | 1/2002 | Swanson | ........................ | 239/1 |
| 2002/0144735 A1 | 10/2002 | Nimberger | .................. | 137/556 |
| 2002/0145057 A1 | 10/2002 | Leedy et al. | ................. | 239/310 |

FOREIGN PATENT DOCUMENTS

GB    864241    3/1961    .................. 86/102
GB   1566583    5/1980

* cited by examiner

*Primary Examiner*—A. Michael Chambers

(57) ABSTRACT

A liquid fertilizer injector system attached to a water source by a water source has an inlet line to input the water from the water source line into the liquid fertilizer injector system. The system's components include a holding tank to receive the water from the inlet line, a collapsible impermeable bag that is filled with liquid fertilizer and is placed in the holding tank, the water from the inlet line collecting in the holding tank and exerting pressure on the collapsible impermeable bag as it collects in the holding tank, an outlet line to disperse the liquid fertilizer back to the water source line, a port position indicator valve on the outlet line, to incrementally control the flow of liquid fertilizer from the outlet line back to the water source line, and a drainage valve to drain any input water in the holding tank.

13 Claims, 5 Drawing Sheets

LIQUID FERTILIZER INJECTOR SYSTEM FOR LAWN SPRINKLER SYSTEMS AND IRRIGATION SYSTEMS

BACKGROUND OF THE INVENTION

1. Field of the Invention

The present invention relates to a liquid fertilizer injector system for lawn sprinkler systems and irrigation systems.

2. Description of the Related Art

Lawn sprinkler systems and irrigation systems are convenient and useful for helping users maintain a healthy lawn or harvest. These lawn sprinkler systems and irrigation systems are known to those that are skilled in the art and serve as a convenient way for people to water their lawn or crops. Users can also apply fertilizer to their lawn or crops by using a fertilizer system for even better results.

U.S. patent application Publication No. 2002/0000476, published on Jan. 3, 2002, describes the use of an improved liquid fertilizer distribution manifold operating in two stages, which includes an accumulator piston located above the primary and secondary ports. A broad range of regulated flow for site-specific farming results in precise, accurate and timely application of liquid fertilizer and pesticides.

U.S. patent application Publication No. 2002/0144735, published on Oct. 10, 2002, describes uniformly distributing and selectively outputting multiple fluid streams of a single or multiple-phase fluid from a fluid distributor manifold. More particularly, the publication discloses a method and system for distributing liquid fertilizer at a substantially equal rate to each of a plurality of distribution lines.

U.S. patent application Publication No. 2002/0145057, published on Oct. 10, 2002, describes the use of a fertilizer mixing device for sprinkler systems including a water inlet, a first water outlet and a second water outlet. The water inlet is in communication with an existing water source. A mixing chamber has a housing having a first opening therein for receiving the first water outlet of the water inlet pipe therein.

U.S. Pat. No. 3,770,198, issued to Mihara, discloses a method and an apparatus for diluting and mixing a variety of chemical solutions such as farm chemicals, pesticides and liquid fertilizers with water to a predetermined proportion.

U.S. Pat. No. 4,171,710 issued to Boynton et al., outlines the use of a closed system for simultaneously mixing pesticide with water and transferring the same to a storage or spray tank for subsequent use. The system includes a pipe casing having a water inlet section for connection to a pump and a water discharge section for connection to the spray tank with a venturi chamber defined between the two.

U.S. Pat. No. 4,324,294, issued to McLoughlin et al., teaches the use of a system for injecting chemicals into a fire fighting system of the type using a plurality of water hoses and having a source of water and a source of chemicals. A servo motor system is connected to automatically meter a certain ration of chemicals into the water supply. The servo motor system is responsive to the total flow to control the chemical pump in order to pump a certain ration of chemicals into the water supply, even if the total flow varies.

U.S. Pat. No. 4,527,353, issued to Newby, shows the use of an irrigation and fertilization control and distribution system characterized by a distribution network and a control assembly coupling the distribution network to a pressurized water source. The control assembly includes an on/off valve mechanism operative to supply water to the distribution network, when the ambient temperature exceeds a predetermined level, and a fertilizer metering mechanism operative to supply liquid fertilizer to the distribution network on the rising portion of a temperature cycle.

U.S. Pat. No. 4,768,712, issued to Terrell, describes the use of a selective liquid fertilizer blending system and apparatus associated with golf courses utilizing automatic irrigation systems to irrigate the various species of turf grasses used on fairways, tees, greens and other areas, the system being adapted to selectively and continuously blend, in a spoon feeding manner, the agronomically correct ratios of liquid fertilizer and irrigation water.

U.S. Pat. No. 4,867,192, issued to Terrell et al., discloses the use of a selective liquid fertilizer blending system and apparatus associated with golf courses utilizing automatic irrigation systems, to irrigate the various species of turf grasses used on fairways, tees, greens and other areas, which includes devices for monitoring and adjusting the pH of the irrigation water.

U.S. Pat. No. 4,870,991, issued to McMillan et al., teaches the use of an apparatus for directing a liquid fertilizer into an irrigation system having a liquid fertilizer flow conduit with the valve of a solenoid valve and the float of a float switch located in series and an electric circuit with the switch of the float switch, solenoid of the solenoid valve and automatic timer device in series. The apparatus directs fertilizer therethrough when electricity is delivered to the switch, solenoid and automatic timer device when the switch is closed by the float and the timer is conducting electricity.

U.S. Pat. No. 4,895,303, issued to Freyvogel, shows the use of a sprinkler system fertilization regulator that automatically mixes a plurality of chemicals for the purpose of fertilization, weed control or insect control. An electrically operated manifold distributes the chemical and water stream to each of the sprinkler zones provided. The output stream pressure is programmable, constant and independent of the incoming fresh water pressure.

U.S. Pat. No. 5,227,068, issued to Runyon, describes the use of methods and apparatuses for enhancing water quality. More particularly, it relates to providing improved irrigation to vegetation in open areas, such as parks and golf courses.

U.S. Pat. No. 5,730,364, issued to Gertie, discloses the use of an automatic fertilizing device, which is installed inline with a below ground water line for an underground sprinkler system, thus placing the entire device below the surface. The device has a fertilizer tablet chamber with an inlet and an outlet at opposite ends, which are connected to the inlet and outlet side of the water line. A fertilizer replenishment passage extends upwardly from the chamber, with an upper end positioned at or below ground level.

U.S. Pat. No. 6,148,839 issued to Gonske, teaches the use of an apparatus and method for injecting a liquid product or chemical into a main water supply line used for agricultural or industrial purposes. A pressure regulating bypass valve has an inlet side connected to an outlet line of a multi-ganged, diaphragm pump. The pump is run at a constant speed and produces a non-pulsatile flow of product. The bypass line of the valve is connected to an inlet line of the pump. The bypass valve is set at a predetermined pressure, discharging any excess product into the bypass line.

U.S. Pat. No. 6,173,732, issued to Davis et al., shows the use of a chemical feeding system for adding either liquid or 100% soluble solid chemicals including fertilizer, insecticide and herbicide to a lawn sprinkler system, either above or below ground level. The system has one or two vertically oriented mixing chambers containing a removable sponge filter. An effluent tube is attached to the bottom of the mixing chamber for recycling through an adjustable flow meter valve. A drain tube with a shutoff valve and a one-way check valve leads to the main sprinkler system.

U.S. Pat. No. 6,267,303, issued to Francis, describes the use of a device for injecting liquid chemical solutions into the flow of a lawn sprinkler system. The device allows the user to easily attach and remove chemical jars without the risk of losing the prime on the pump.

Great Britain Patent No. 864,241, published Mar. 29, 1961, discloses the use of an injector assembly for automatically injecting liquid fertilizer into an irrigation system for greenhouses, groves or orchards in proportion to the rate of flow of water therein.

Great Britain Patent No. 1,566,583, published May 8, 1980, teaches the use of an apparatus for mixing water and fertilizer for use in the automatic irrigation and fertilization of plants in a greenhouse, especially a small domestic greenhouse.

Although each of these patents and publications describe irrigation or sprinkler devices, what is really needed is a device to provide a constant volume of liquid fertilizer solution into a lawn sprinkler system without diluting the fertilizer solution. Such an apparatus or device would be well-received in the marketplace and would address a strong demand for such a device or apparatus.

None of the above inventions and patents, taken either singly or in combination, is seen to describe the instant invention as claimed. Thus a liquid fertilizer injector system for irrigation and sprinkler systems solving the aforementioned problems is desired.

SUMMARY OF THE INVENTION

The present invention is a liquid fertilizer injector system attached to a source of water by a water source line. The system has an inlet line to input the water from the water source line into the liquid fertilizer injector system. The system's components include a holding tank to receive the water from the inlet line, a collapsible impermeable bag filled with liquid fertilizer that is placed in the holding tank, the water from the inlet line collecting in the holding tank and exerting pressure on the collapsible impermeable bag as the water collects in the holding tank, an outlet line to disperse the liquid fertilizer back to the water source line, a port position indicator valve on the outlet line to incrementally control the flow of liquid fertilizer from the outlet line back to the water source line, and a drainage valve to drain any input water in the holding tank.

Accordingly, it is a principal object of the invention to provide a liquid fertilizer system that can be easily incorporated into an existing lawn sprinkler system or irrigation system.

It is another object of the invention to provide a constant volume of liquid fertilizer solution into a lawn sprinkler system or irrigation system without diluting the fertilizer solution.

It is a further object of the invention to provide a liquid fertilizer injection system that can be easily installed to an existing lawn sprinkler system or irrigation system.

It is an object of the invention to provide a liquid fertilizer injection system that promotes lawn and crop growth and reduces water consumption.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
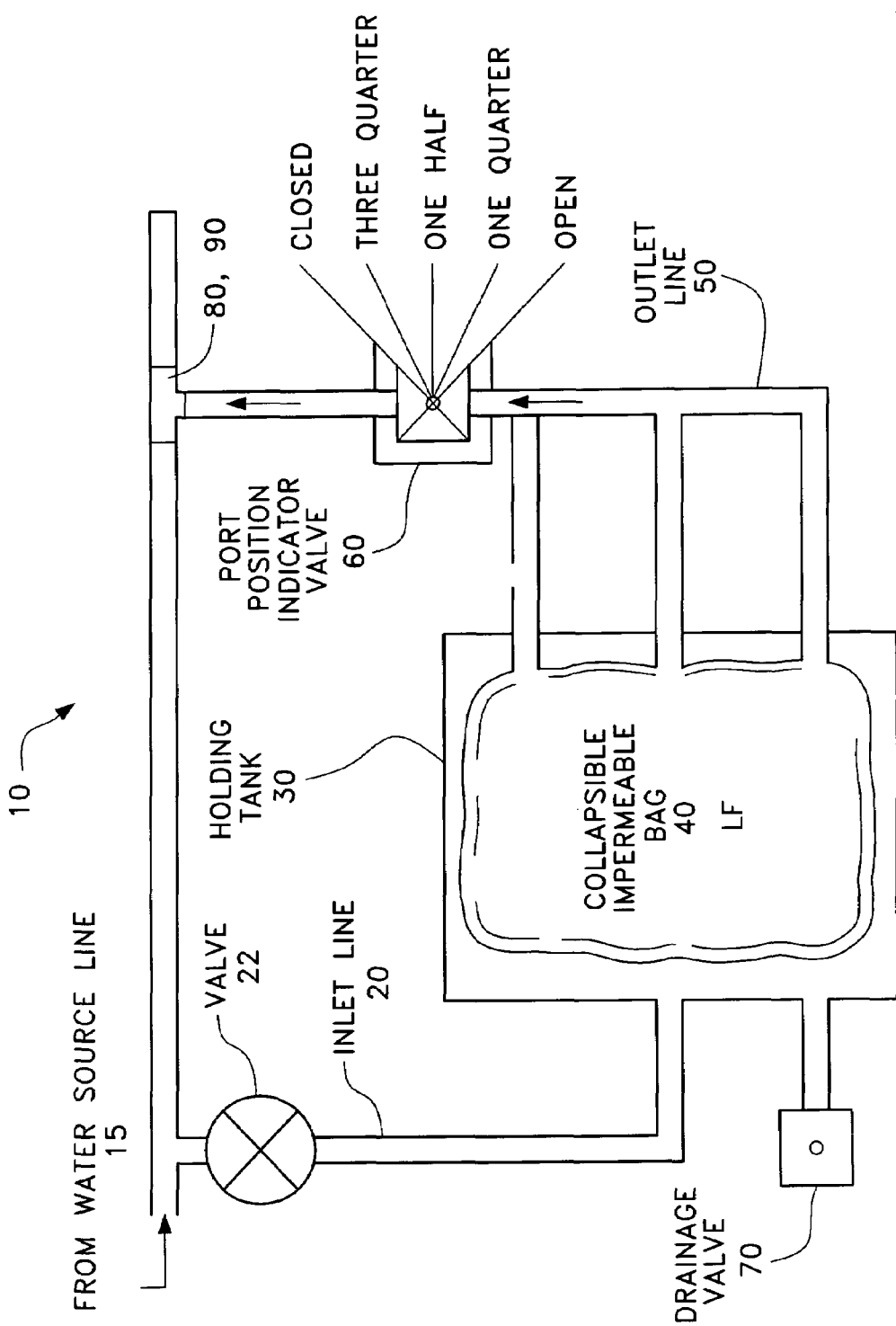
FIG. 1 is a schematic diagram of a first embodiment of a liquid fertilizer injector system being adjoined to a water source line according to the present invention.

The present invention is a liquid fertilizer injector system 10, as is shown in FIG. 1. The system is connected to a water source line 15 connected to a water source (not shown).

The liquid fertilizer injector system 10 comprises a tank inlet line 20 to input water from the water source line 15 into the liquid fertilizer injector system 10, a holding tank 30 to receive the water from the inlet line 20, a collapsible impermeable bag 40 that is filled with liquid fertilizer LF and is placed in the holding tank 30, the water from the inlet line 20 collecting in the holding tank 30 and exerting pressure on the collapsible impermeable bag 40 as the water collects in the holding tank 30. The liquid fertilizer injector system 10 further comprises an outlet line 50 to disperse the liquid fertilizer LF from the bag 40 to the water source line 15 downstream from the tank inlet line 20, a port position indicator valve 60 on the outlet line 50, to incrementally control the flow of liquid fertilizer LF from the outlet line 50 to the water source line 15 and a drainage valve 70 to drain and release any input water in the holding tank 30.

Typically the water from the water source line 15 is controlled by a valve 22 on the inlet line 20 as it goes into the holding tank 30. Once in the holding tank 30, which can act as a closed system, water collects in the holding tank 30 and surrounds the collapsible impermeable bag 40, which is attached to the outlet line 50. The water does not react directly with the liquid fertilizer LF in the collapsible impermeable bag 40 because the collapsible impermeable bag 40 is not penetrated by the water. Instead, pressure is asserted by the water W in the holding tank 30 on the collapsible impermeable bag 40. This design allows for a constant and steady flow of liquid fertilizer LF from the collapsible impermeable bag 40 and into the outlet line 50, which is desirable for better control of the liquid fertilizer LF as it goes through the liquid fertilizer injector system 10.

A port position indicator valve 60 is provided on the outlet line 50 to control the outflow of liquid fertilizer LF coming from the collapsible impermeable bag 40. The port position indicator valve 60 can be incrementally set in a fully closed position, a ¾ths closed position, a ½ closed position, a ¼th closed position and a fully open position. Once passed through the port position indicator valve 60, the liquid fertilizer LF is drawn back into the water source line 15 by a union connection 80 and injector valve 90, which are discussed in more detail below.

Once the liquid fertilizer LF is emptied and is completely pushed out of the collapsible impermeable bag 40, a drainage valve 70 is used to empty water from the holding tank 30. The drainage valve 70 can be opened when the collapsible impermeable bag 40 is out of liquid fertilizer LF and the bag 40 may be easily replaced or refilled with liquid fertilizer LF for use again.

Figure 2:
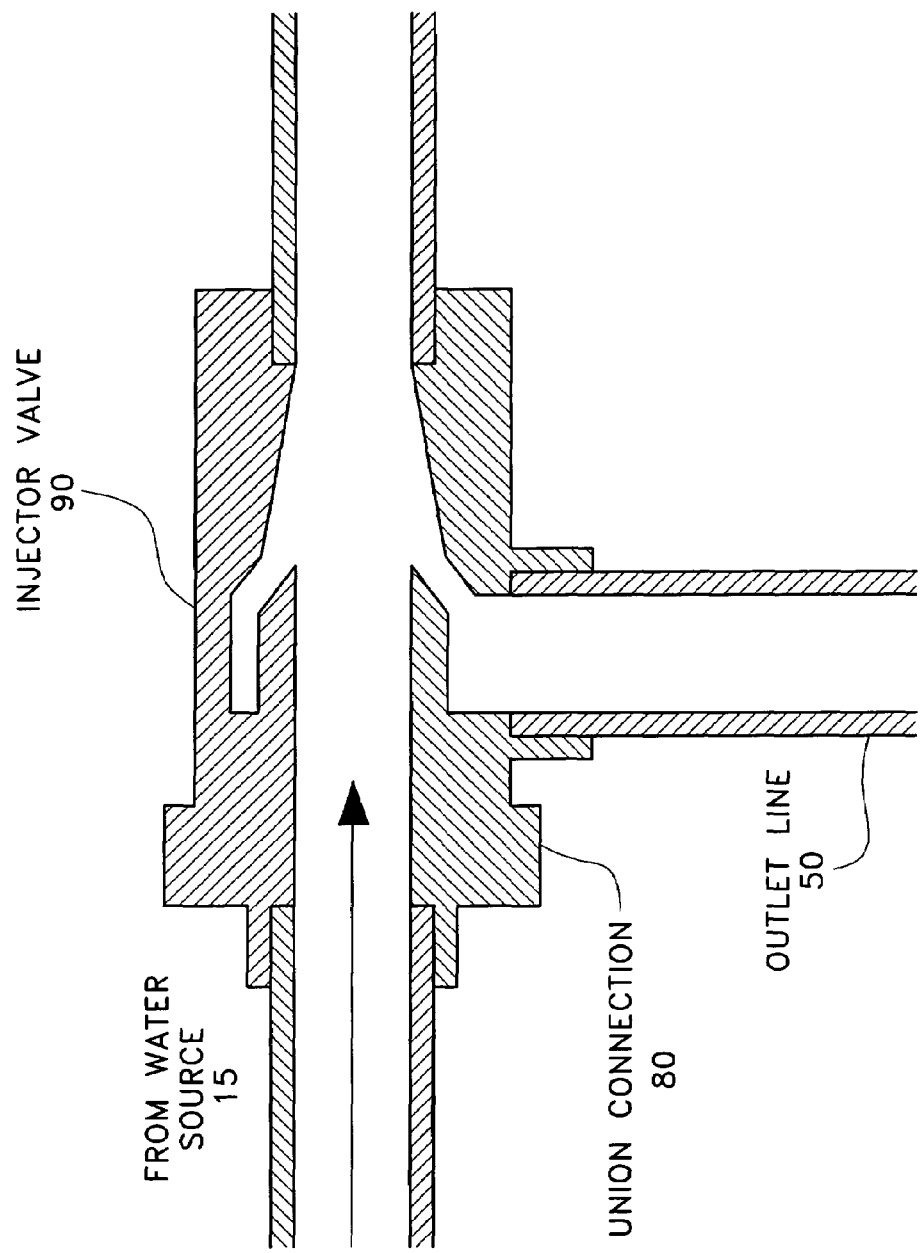
FIG. 2 is a side perspective view of a union connection and injector valve of the liquid fertilizer injector system.

FIG. 2 depicts the dynamics of what happens in the water fertilizer injector system 10 at the point where the outlet line 50 meets with the water source line 15. A modified T-shaped combination injector valve 90 and union connection 80 is used to combine the outlet line 50 with the water source line 15. The combination injector valve 90 and union connection 80 acts like an aspirator (not shown) on the outlet line 50, which draws the liquid fertilizer LF in the outlet line 50 into the water source line 15.

The liquid fertilizer injector system 10 can be used with any type of water source lines 15, such as those from a city water main or a pumped well water line, and which are typically used in combination with a lawn sprinkler system (not shown) or from an irrigation system (not shown).

Figure 3:
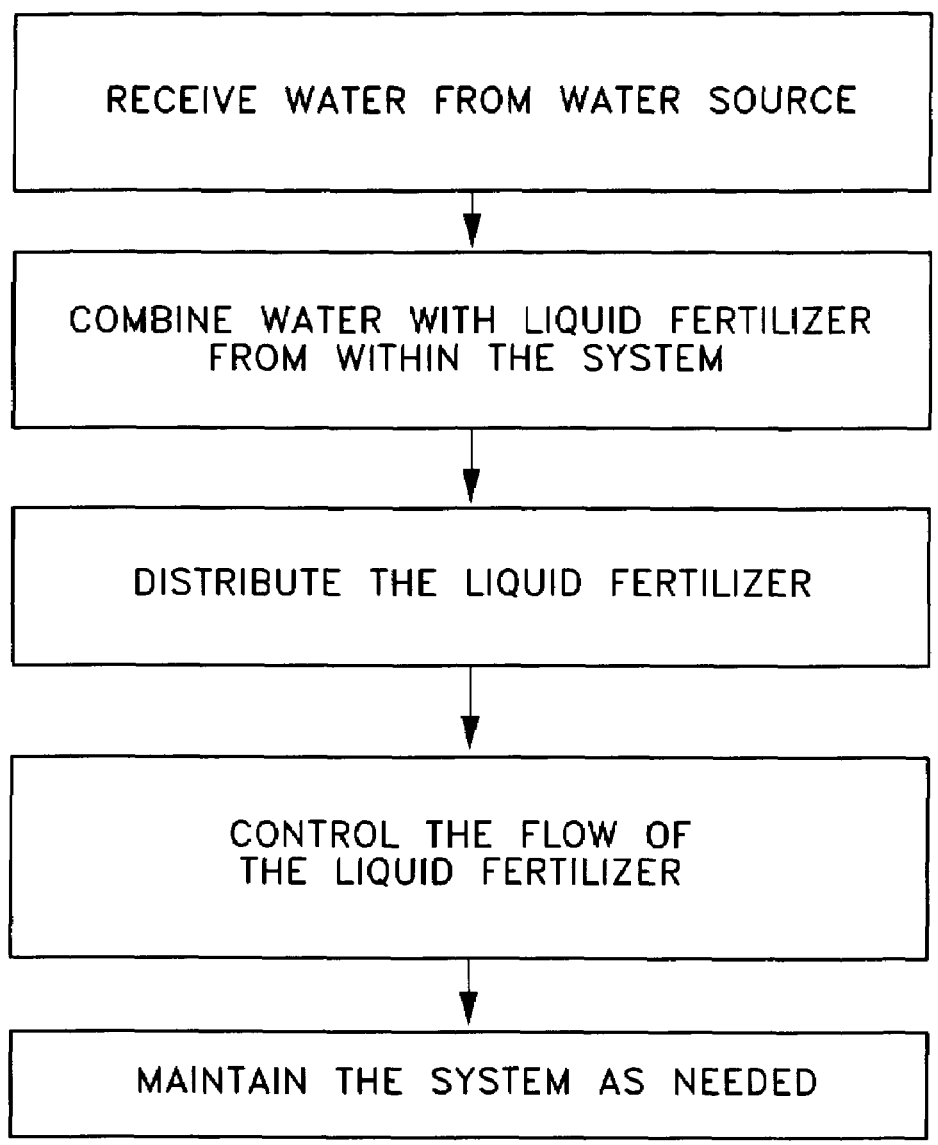
FIG. 3 is a chart showing the steps in a method of utilization of the first embodiment of the liquid fertilizer injector system.

A chart 100 showing a method for operating the first embodiment of the liquid fertilizer injector system 10 is outlined in FIG. 3. The method comprises the steps of receiving the water from the water source, combining the water with the liquid fertilizer LF from within the liquid fertilizer injection system 10, distributing the liquid fertilizer LF, controlling the flow of the liquid fertilizer LF from the liquid fertilizer injection system 10 and maintaining the liquid fertilizer injection system 10 as needed. The method further comprises the additional step of allowing the water to exert pressure on the liquid fertilizer LF that is kept in a collapsible impermeable bag 40 within a holding tank 30. The method further comprises an additional step of using an incremental port position indicator valve 60 for controlling the flow of the liquid fertilizer LF, and further comprises an additional step of draining any water from the liquid fertilizer injection system 10 when the collapsible impermeable bag 40 is emptied.

Figure 4:
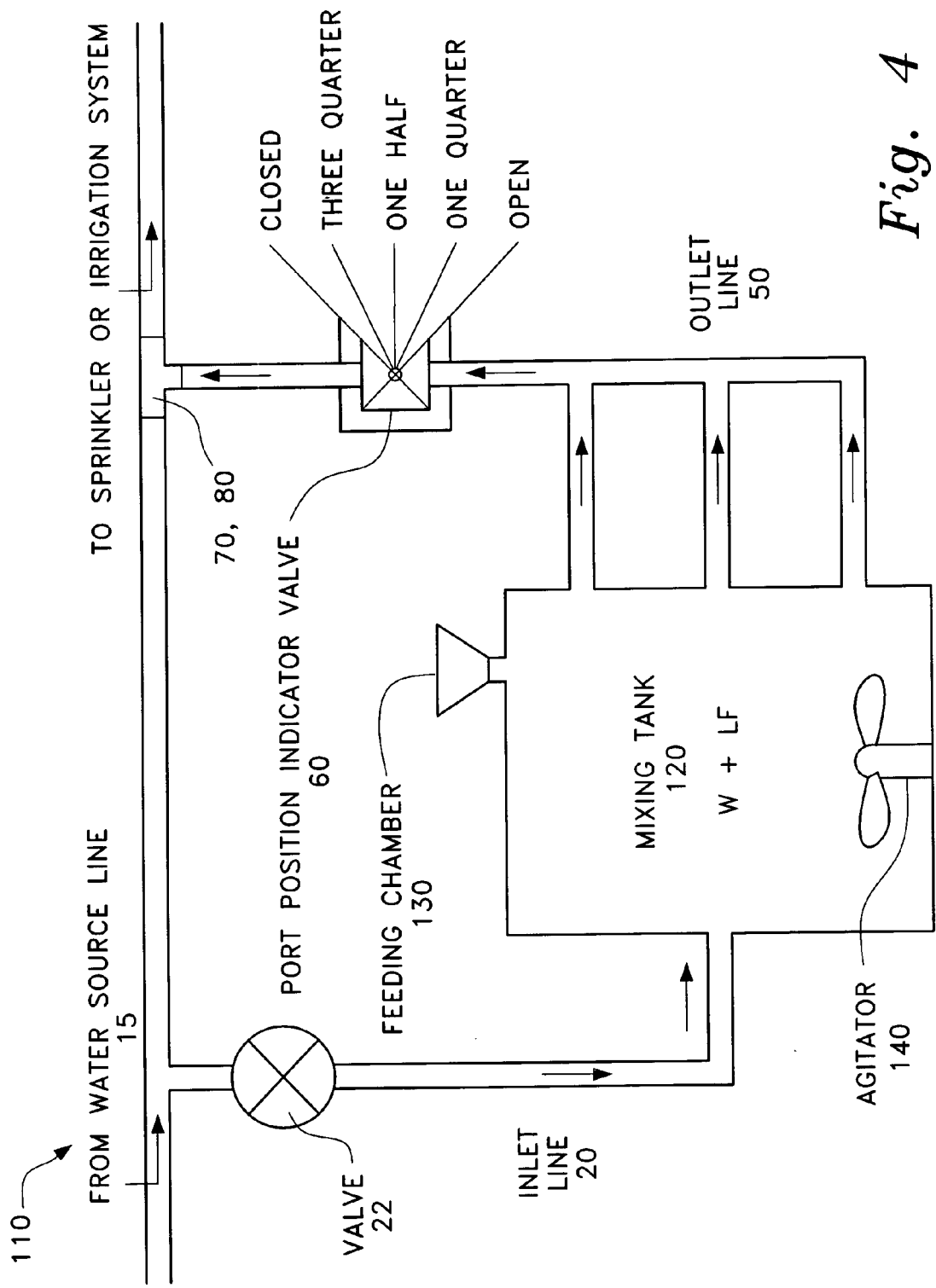
FIG. 4 is a schematic diagram of a second embodiment of a liquid fertilizer injector system according to the present invention.

FIG. 4 depicts a second embodiment of the liquid fertilizer injector system 110. In the second embodiment, the liquid fertilizer injector system 110 is attached to a water source line 15, and comprises a tank inlet line 20 to receive water W from the water source line 15, a mixing tank 120 to receive water from the inlet line 20, a feeding chamber 130 where liquid fertilizer LF is added to the mixing tank 120 to form a mixture W+LF of water and liquid fertilizer in the mixing tank 120, an agitator 140 to promote mixing and solubility between the water W from the inlet line 20 and the liquid fertilizer LF from the feeding chamber 130 within the mixing tank 120 and an outlet line 50 to disperse a water and liquid fertilizer mix W+LF back to the water source line 15 from the mixing tank 120. There is also a port position indicator valve 60 on the outlet line 50, to incrementally control the flow of water and liquid fertilizer mix W+LF from the outlet line 50 back to the water source line 15, as in the first embodiment of the liquid fertilizer injector system 10. The port position indicator valve 60 can go into a fully closed position, a ¾ths closed position, a ½ closed position, a ¼th closed position and a fully open position.

Similarly, the second embodiment of the liquid fertilizer injector system 110 also utilizes a drainage valve 70 and a union connection 80 that produces an aspirator effect and draws the water and liquid fertilizer mix W+LF from the outlet line 50 into the water source line 15. The water source line 15 can be for a lawn sprinkler system (not shown) or for an irrigation system (not shown) that incorporates the second embodiment of the liquid fertilizer injector system 110.

Figure 5:
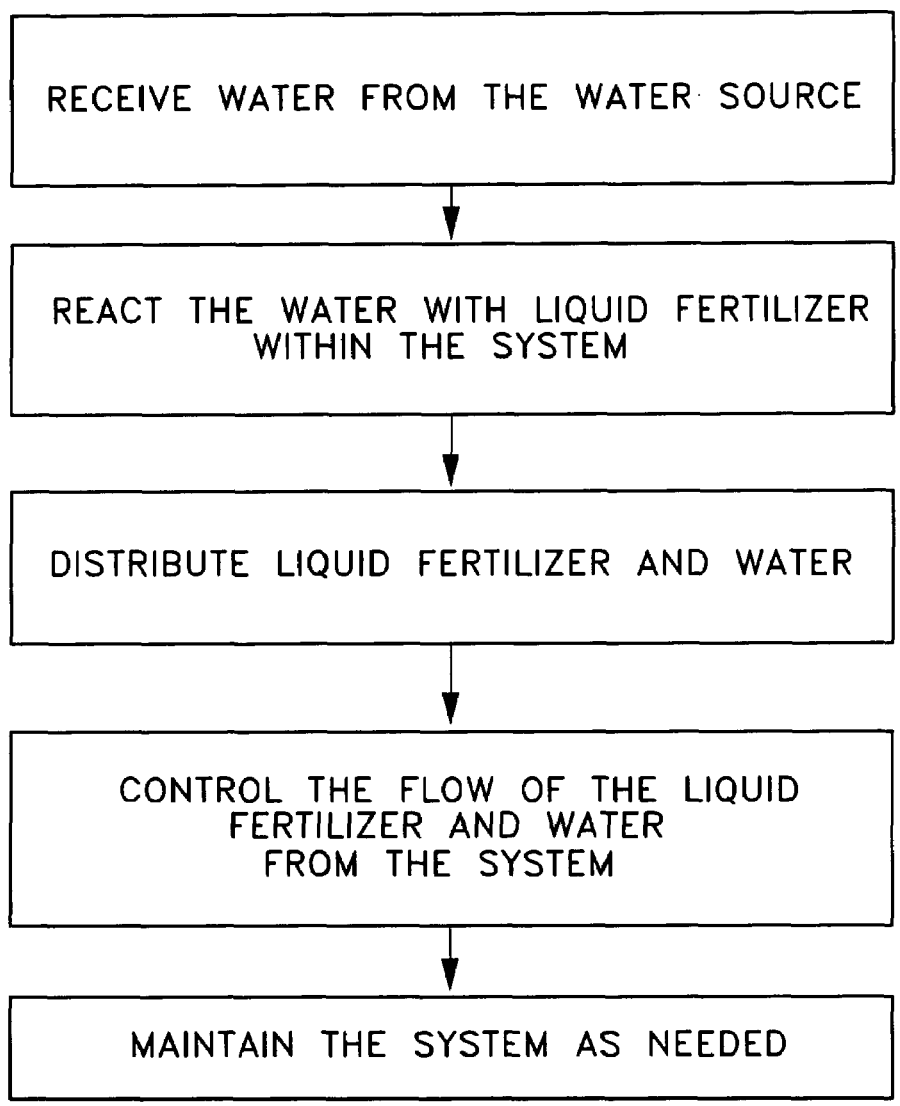
FIG. 5 is chart showing the steps in a method of utilization of the second embodiment of the liquid fertilizer injector system.

FIG. 5 shows a chart 150 depicting the steps in a method that utilizes the second embodiment of the liquid fertilizer injector system 110. The method for operating the second embodiment liquid fertilizer injector system 110 comprises the steps of receiving the water W from the water source, reacting the water W with the liquid fertilizer LF, distributing the water and liquid fertilizer mix W+LF, controlling the flow of the water and liquid fertilizer mix W+LF, and maintaining the system 110 as needed. The comprises the additional steps of the water W reacting with the liquid fertilizer LF in an agitated mixing tank 120 and using a port position indicator valve 60 for controlling the flow of the water and liquid fertilizer W+LF.

Usage and installation of both the first embodiment of the liquid fertilizer injector system 10 and the second embodiment of the liquid fertilizer injector system 110 is uncomplicated. Either embodiment can be added onto a water source line 15 without significant loss of flow and water pressure to a water source such as a city water main or pumped well water line.

It is to be understood that the present invention is not limited to the embodiments described above, but encompasses any and all embodiments within the scope of the following claims.

I claim:

1. A method for operating a liquid fertilizer injector system using liquid fertilizer with water and a water source, comprising the steps of:
   providing a holding tank;
   providing a collapsible impermeable bag disposed in the holding tank;
   the impermeable bag containing a predetermined amount of fertilizer;
   receiving a supply of water from a water source in the holding tank;
   expelling the fertilizer via the supply of water in the holding tank exerting pressure on the impermeable bag forcing the fertilizer out of the impermeable bag;
   controlling the flow of the liquid fertilizer from the impermeable bag;
   providing an injection valve for combining the water of the water supply line with the liquid fertilizer from within the liquid fertilizer injection system;
   distributing the liquid fertilizer; and
   maintaining the liquid fertilizer in the impermeable bag as needed.

2. The method according to claim 1, wherein the step of controlling the flow of the liquid fertilizer from the liquid fertilizer injection system, further comprises an additional step of using an incremental port position indicator valve for controlling the flow of the liquid fertilizer.

3. The method according to claim 1, wherein the step of maintaining the liquid fertilizer injection system as needed, further comprises an additional step of draining any water from the liquid fertilizer injection system when the collapsible impermeable bag is emptied.

4. A method for operating a liquid fertilizer injector system using liquid fertilizer with water and a water source, comprising the steps of:
   providing a mixing tank having an inlet line;
   providing a feeding chamber attached to the mixing tank for inserting a predetermined amount of liquid fertilizer into the mixing tank;

receiving a supply of water from a water source in the mixing tank;

mixing the supply of water with the predetermined amount of liquid fertilizer in the mixing tank;

controlling the flow of the mixed liquid fertilizer and water from the mixing tank;

distributing the mixed liquid fertilizer and water; and maintaining the liquid fertilizer in the feeding chamber as needed.

5. The method according to claim 4, wherein combining the water with the liquid fertilizer from within the liquid fertilizer injection system, further comprises an additional step of agitating the water and the liquid fertilizer in the mixing tank.

6. The method according to claim 4, wherein the step of controlling the flow of the liquid fertilizer and water from the liquid fertilizer injection system, further comprises an additional step of using an incremental port position indicator valve for controlling the flow of the liquid fertilizer and water.

7. A liquid fertilizer injector system attached to a source of water by a water source line, the system comprising:

an inlet line adapted for attachment to a water source line;

a holding tank connected to said inlet line;

a collapsible impermeable bag disposed in said holding tank;

a predetermined amount of liquid fertilizer disposed within said impermeable bag;

an outlet line connected between said bag and the water source line downstream from said input line;

a port position indicator valve disposed in said outlet line for incrementally controlling the flow of liquid fertilizer from said outlet line back to the water source line; and a drainage valve to drain and release any input water in said holding tank;

wherein pressure from water entering said tank from the water source line compresses said bag to force said liquid fertilizer through said output line and into water flowing in the water source line for subsequent dispersion.

8. The system according to claim 1, wherein said port position indicator valve has a fully closed position, a ¾ths closed position, a ½ closed position, a ¼th closed position and a fully open position.

9. The system according to claim 1, further comprising a combination union connection and injector valve adapted for connection to the water source line, said outlet line being connected to said injection valve.

10. The system according to claim 1, wherein said drainage valve has an open position for draining water from said tank.

11. A liquid fertilizer injector system attached to a water source line, comprising:

an inlet line adapted for connection to a water source line;

a mixing tank connected to said inlet line, said inlet line providing a predetermined amount of water from the water supply line to said mixing tank;

a feeding chamber connected to said tank said feeding chamber for adding liquid fertilizer to said mixing tank;

an agitator disposed in said mixing tank, said agitator mixing the liquid fertilizer with the predetermined amount of water from the inlet line;

an outlet line connected to said mixing tank and adapted for connection to the water source line downstream from said input line; and a port position indicator valve disposed in said outlet line for incrementally controlling the flow of the mix of water and said liquid fertilizer in the outlet line.

12. The system according to claim 11, wherein said port position indicator valve has a fully closed position, a ¾ths closed position, a ½ closed position, a ¼ closed position and a fully open position.

13. The system according to claim 11, further comprising a combination union connection and an injector valve adapted for being disposed in the water source line downstream from said input line, said output line being connected to said injector valve.

* * * * *